Patented Jan. 4, 1949

2,458,123

UNITED STATES PATENT OFFICE 2,458,123

SOLENOID ACTUATED VALVE

Henry G. Wasserlein, Joliet, Ill., assignor to Phillips Control Corp., Chicago, Ill., a corporation of Illinois Application July 13, 1946, Serial No. 683,565

5 Claims. (Cl. 175—338)

The present invention relates to solenoid operated valves and is particularly directed to a novel solenoid construction for obtaining valve actuation which is applicable readily to a wide variety of valve sizes, etc., and which is self-contained.

It is the principal purpose of my invention to provide a novel solenoid construction wherein the coil is cooled by air passages provided in the magnetic parts of the solenoid, and in the shell, the passages being shielded at the top to keep out dirt and splash or drip.

Another purpose of my invention is to provide means whereby to increase the pull on the solenoid plunger at some distance from the plunger stop in order to obtain sufficient opening force for the plunger with less final holding force against the stop. My invention contemplates a novel arrangement of the plunger stop and a surrounding sleeve whereby the sleeve acts as a magnetic shunt to increase the flux strength beyond the plunger stop and thus provide additional pull on the plunger at a distance from the stop.

It is a further object of my invention to provide a novel plunger head for engaging the stop embodying means for releasing the plunger from the stop when the coil is deenergized to avoid failure of the plunger to drop, due to mechanical or magnetic sticking.

The present invention is embodied in a valve operating device of the "packless" type wherein the plunger works freely in a non-magnetic tube that is sealed to the plunger stop, this tube being open to the fluid being controlled by the valve.

The nature and advantages of my invention will appear more fully from the following description and the accompanying drawings. It should be understood, however, that the description and drawings are illustrative only, and should not be considered as limiting the invention except insofar as it is limited by the claims.

Figure 3:
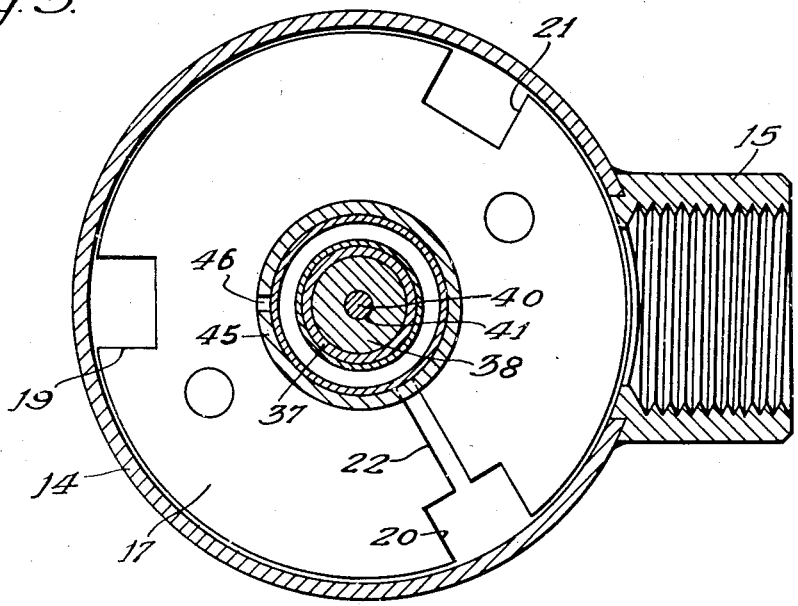
Figure 3 is a sectional view taken on the line 3—3 of Figure 1.

Referring now to the drawings, my invention is shown as applied to the control of a valve 9 which is positioned in a valve body 7. A mounting base 8 is provided on the body 7. The valve seat 10 is removable and has a molded synthetic rubber ring 11 set therein for engagement by the tapered end of the valve 9. A copper gasket 12 is interposed between the seat 10 and the partition 13 of the body 7. The novel features of my invention are embodied in the solenoid for controlling the valve 9. A case 14 in the form of a cup has a nipple 15 for connection to electrical conduit either flexible or rigid, through which the electrical leads (not shown) are brought in to a coil 16. At the ends of the coil 16 are coil washers 17 and 18 of magnetic material. These washers are preferably constructed by using thin laminations, so as to reduce eddy current losses. Each washer has its periphery provided with at least three notches, 19, 20 and 21, (see Figure 3) so that air may circulate freely past the washers. The laminations of the washers also are slotted as shown at 22 to cut down eddy current.

Figure 1:
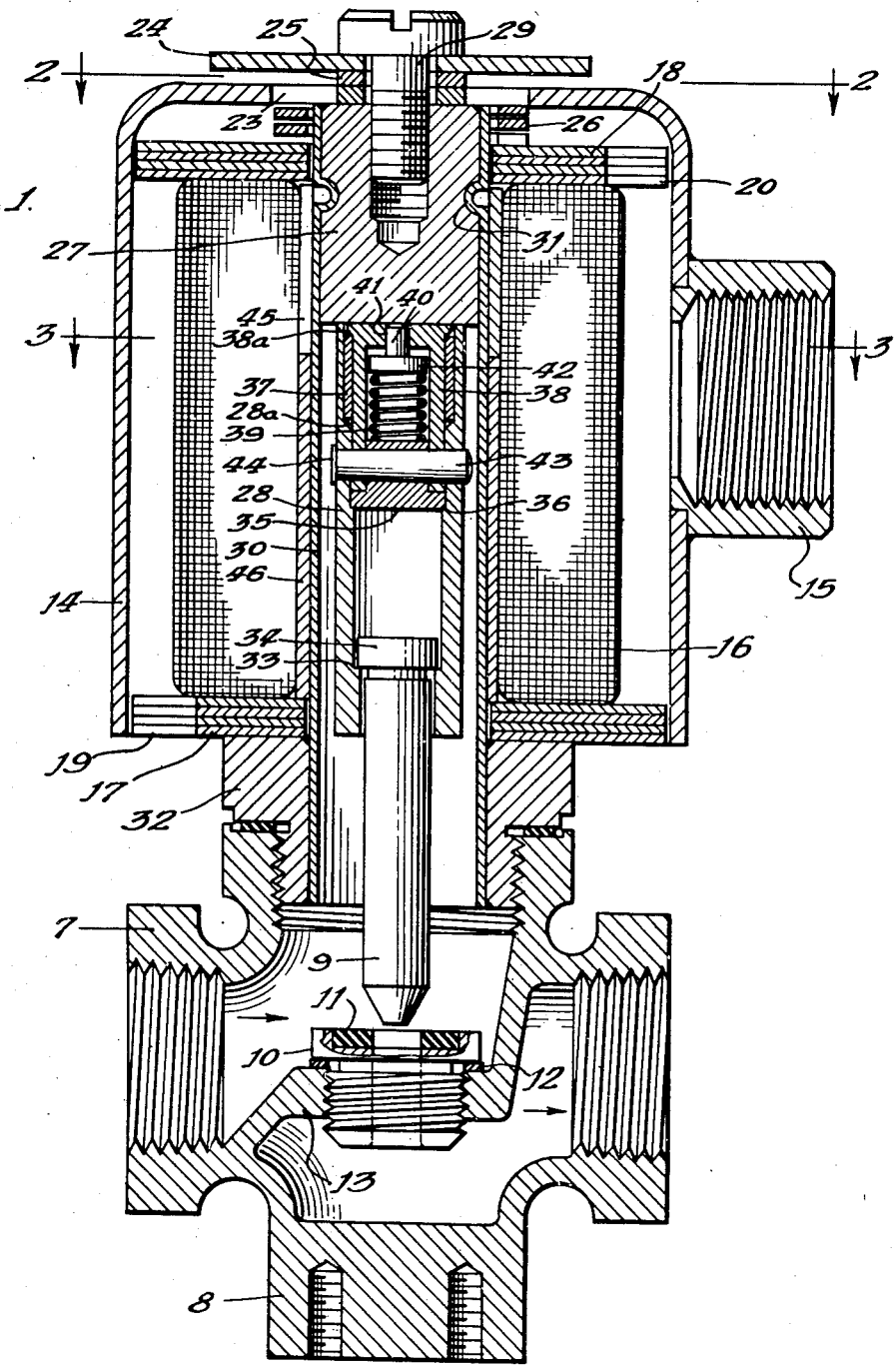
Figure 1 is a vertical sectional view through a valve and solenoid embodying my invention.
Figure 2:
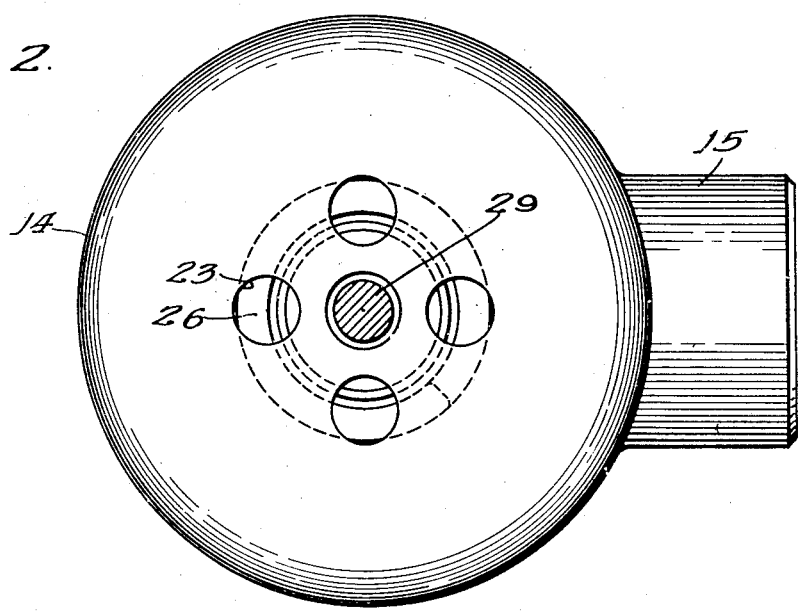
Figure 2 is a sectional view taken on the line 2—2 of Figure 1.

In order to complete an air passage vertically through the case 14, I provide a series of apertures 23 (see Figure 2) in the top of the case. A cover plate 24 is supported above the openings 23 in spaced relation to the case 14 by a washer 25. A spring 26 is interposed between washer 18 and the case 14 to keep the washers pressed against the ends of the coil 16.

A stop 27 for the solenoid plunger 28 is threaded to receive a screw 29 which clamps the cover plate 24 and the case to the stop 27.

The stop is secured in a tube 30 of non-magnetic material such as nickel silver, which has high resistivity, and consequently serves to suppress eddy current heating. The stop is fastened in the tube by grooving the stop as shown at 31, and rolling the tube into the groove. The tube is soldered or brazed on to the stop. The tube 30 projects below the washer 17, and has a bonnet bushing 32 brazed, soldered or otherwise secured thereon, the bushing being threaded for securing it to the valve body 7.

The plunger 28 comprises a tube of magnetic material, the lower end of which has a shoulder 33 forming a stop for a head 34 on the valve 9. In the upper end of the plunger tube 28 I provide a stop engaging assembly. This assembly comprises a plug 35 seated in the tube 28. A copper shading ring 37 is seated in the upper end of the tube 28, and a headed sleeve 38 of magnetic material fits within the ring 27, and over the plug 35, as shown. An angular shoulder 38a is provided under the head of the sleeve 38. A shoulder 28a is provided in the tube 28. These shoulders function to swedge the copper shading ring slightly out at its top edge and inward at its bottom edge when the sleeve 38 is drawn down in the tube 28. This construction keeps the parts tight to prevent any A. C. hum during the life of the unit. The sleeve 38 has a spring 39 therein bearing on plug 35. This spring is a "kick-off" spring. It presses a small plunger 40 outwardly through an opening 41 in the head of the sleeve 38. The plunger has a head 42 against which the spring 39 presses. The sleeve 38 and the plug 35 are fastened together and the sleeve is drawn tightly into the tube 28 to swedge the ring 37 as described above, by a tapered pin 43 which is driven through suitable tapered apertures in the plug, sleeve and tube, and riveted tight as indicated at 44.

An important feature of the solenoid is the provision of means to increase the effective pull on the plunger 28 when the upper end of the plunger is still spaced from the stop 27. This means comprises a relatively thick sleeve 45 of magnetic material. The sleeve 45 preferably is slotted to decrease eddy current loss. It extends below the end face of the stop 27 a distance approximately the distance the valve 9 moves between open and closed position. In actual dimensions the extension is about one-eighth inch as the drawing shows the device enlarged to twice its actual size. The sleeve 45 acts as a magnetic shunt, increasing the flux strength at a point below the face of the stop 27. This effectively increases the pull on the plunger 28 when it is spaced from the stop and the valve 9 is in valve closing position.

The sleeve 45 is held in vertical position by a spacer 46. This spacer may be of any suitable non-magnetic material such as fiber or brass. Its function is to keep the sleeve 45 in place.

It is believed that the nature and advantages of my invention will be clear from the foregoing description and the drawings.

Having thus described my invention, I claim:

1. In a solenoid, a cup shaped case, a coil therein, laminated washers of magnetic material at the ends of said coil and fitting the interior of said case, said washers being provided with notches in their peripheries providing air passages, the case having apertures in its closed end, a cover plate over the apertures and spaced therefrom, a non-magnetic sleeve extending through the coil and washers, a stop plug of magnetic material filling the upper end of the sleeve and sealed thereto, said case and cover being secured to said plug, and a plunger of magnetic material freely movable in said sleeve and adapted to be attracted against the stop plug when the coil is energized.

2. In a solenoid, a cup shaped case, a coil therein, laminated washers of magnetic material at the ends of said coil and fitting the interior of said case, said washers being provided with notches in their peripheries providing air passages, the case having apertures in its closed end, a cover plate over the apertures and spaced therefrom, a non-magnetic sleeve extending through the coil and washers, a bushing on the lower end of the sleeve, a spring between the closed end of the case and the upper washer pressing the coil and washers toward said bushing, a stop plug of magnetic material filling the upper end of the sleeve and sealed thereto, said case and cover being secured to said plug, and a plunger of magnetic material freely movable in said sleeve and adapted to be attracted against the stop plug when the coil is energized.

3. In a solenoid, a plunger, a guide tube for said plunger, and a plunger stop at one end of the tube, said plunger having a tubular end facing said stop, a plug extending into said tubular end and having a head thereon for engaging the stop, opposed tapered shoulders on said head and in the tubular end of said plunger, a shading ring surrounding the plug and wedged between the tapered shoulders, and means holding the plug in the tubular end of the plunger and wedging the shading ring between said shoulders.

4. In a solenoid, a cup shaped case, a coil therein, washers of magnetic material at the ends of said coil and fitting the interior of said case, said washers having notches in their peripheries, the case having apertures in its closed end, a cover plate over the apertures and spaced therefrom, a non-magnetic sleeve extending through the coil and washers, a stop plug sealing the upper end of the sleeve, said case and cover being secured to said plug, and a plunger of magnetic material freely movable in said sleeve and adapted to be attracted against the stop plug when the coil is energized.

5. In a solenoid, a plunger, a guide tube for said plunger, and a plunger stop in one end of the tube, said plunger having a tubular end facing said stop, a plug extending into said tubular end and having a head thereon for engaging the stop, said plug being hollow with an opening through the head to the stop engaging face thereof, a headed kick-off pin in the plug extending through said opening, a spring in the plug urging the kick-off pin outward, and means securing the spring in place in said plug.

HENRY G. WASSERLEIN.

REFERENCES CITED

The following references are of record in the file of this patent:

UNITED STATES PATENTS

| Number | Name | Date |
|---|---|---|
| 2,279,243 | Parsons | Apr. 7, 1942 |
| 2,297,626 | Lennholm et al. | Sept. 29, 1942 |
| 2,343,806 | Scofield | Mar. 7, 1944 |